United States Patent [19]

Lee et al.

[11] Patent Number: 4,477,819
[45] Date of Patent: Oct. 16, 1984

[54] OPTICAL RECORDING MEDIUM

[75] Inventors: Michael H. Lee, San Jose; Aare Onton; Harold Wieder, both of Saratoga, all of Calif.

[73] Assignee: International Business Machines Corporation, Armonk, N.Y.

[21] Appl. No.: 388,319

[22] Filed: Jun. 14, 1982

[51] Int. Cl.³ .............................................. G01D 15/34
[52] U.S. Cl. ................................ 346/76 L; 346/135.1; 430/945
[58] Field of Search ................. 346/135.1, 76 L, 76 R, 346/1.1; 430/945

[56] References Cited

U.S. PATENT DOCUMENTS 3,740,761  6/1973  Teehter ............................ 346/135.1
3,959,799  5/1976  Gambino et al. .................... 346/135
4,000,492 12/1976  Willens ................................ 346/1
4,214,249  7/1980  Kasai et al. ................... 346/135.1 X
4,237,468 12/1980  Nahara et al. ...................... 346/135
4,241,356 12/1980  Brill et al. ........................ 346/135.1
4,345,261  8/1982  Wilkinson ......................... 346/76 L

OTHER PUBLICATIONS

Streetman, *Solid State Electronic Devices* Pub. 1980, p. 2.

Primary Examiner—A. D. Pellinen
Assistant Examiner—Todd E. DeBoer
Attorney, Agent, or Firm—Otto Schmid, Jr.

[57] ABSTRACT

An optical recording medium comprising adjacent thin layers of two different materials, which, upon marking with an energy beam, form a marked area comprising an alloy or mixture of the two materials. The optical properties of the marked area has contrast sufficiently different from the optical properties of the unmarked area so that the marked area can be reliably sensed. One of the first of the thin layers comprises a metal and the other of the thin layers comprises a metal or a semiconductor. The metals are taken from the group comprising Al, Au, Pb and Sn and the semiconductors are chosen from the group comprising Ge and Si.

6 Claims, 6 Drawing Figures

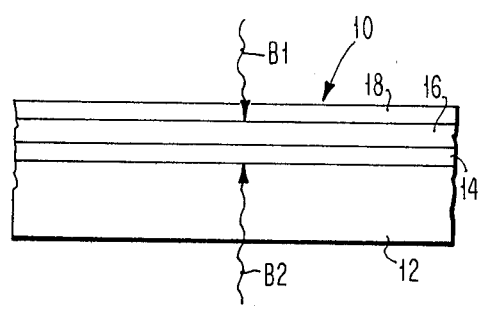
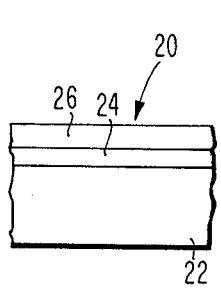
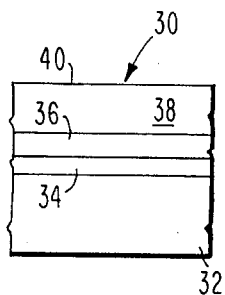
FIG.1  FIG.2  FIG.3
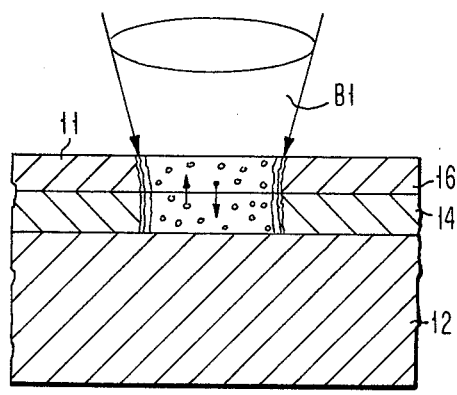
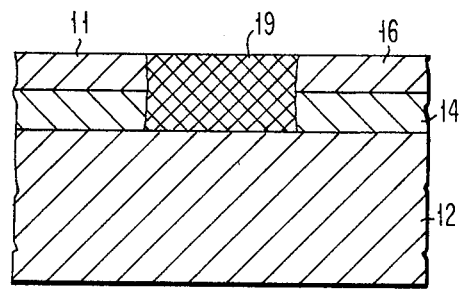
FIG.4  FIG.5
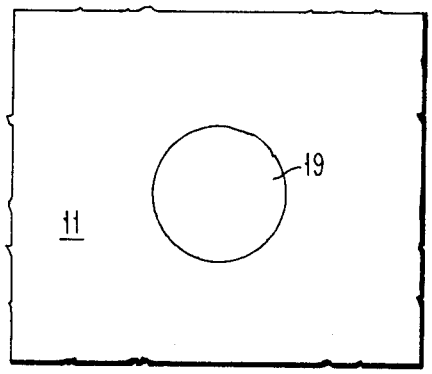
FIG.6

4,477,819

OPTICAL RECORDING MEDIUM

CROSS REFERENCE TO RELATED APPLICATION

U.S. patent application Ser. No. 276,283 filed June 22, 1981 now abandoned, entitled "Silicon Laminated Media for Archival Optical Storage" discloses a recording medium in which one layer is silicon and in which a silicon compound is formed during the recording operation.

BACKGROUND OF THE INVENTION

1. Field of Invention

The invention relates to an optical recording medium, and more particularly, to a storage medium in which information can be stored by exposure to a focused laser beam.

2. Description of Prior Art

There have been known in the art optical recording media which result in the removal of material in regions approximating the diffraction-limited spot size of the recording laser. While high contrast between the written and unwritten areas has generally been achieved, the signal-to-noise ratio has been limited in some cases by edge effects around the periphery of the spots, which cause some scattering of the read beam. Additionally, these media, such as those based on Te and Te alloys, suffer from corrosion effects.

There have also been known a number of other optical recording media and other means of marking these media; however, the ones of these media which have achieved long-life recording of information have required higher laser power levels than is desirable, i.e., higher than that achieved with Te-based alloys.

SUMMARY OF THE INVENTION

It is, therefore, the principal object of this invention to provide an optical recording medium which is capable of storing information in response to a laser beam of acceptable power level and which will also have sufficient lifetime for archival storage purposes.

In accordance with the present invention, there is provided an optical recording medium comprising adjacent thin layers of at least two materials which, upon marking with an energy beam, endothermically form a marked area having optical properties different from the optical properties of the unexposed structure, wherein the layered materials are selected from a first group comprising metals and a second group comprising metals or semiconductors.

The metals are selected from the group comprising Al, Au, Pb, and Sn and the semiconductors are chosen from the group comprising Ge and Si. The endothermically formed marked area comprises an alloy or mixture of the materials.

The materials disclosed here produce an optical recording medium capable of recording information at high recording density with acceptable laser power levels and which has lifetime characteristics suitable for archival storage purposes.

BRIEF DESCRIPTION OF THE DRAWINGS

FIG. 1 is a side view of an optical recording medium in accordance with this invention;

FIG. 2 is a side view of an alternate embodiment of the optical recording medium in accordance with this invention;

FIG. 3 is a side view of a further embodiment of the optical recording medium in accordance with this invention;

FIG. 4 is a side view partially in section showing the recording of a marked area in accordance with this invention;

FIG. 5 is a side view partially in section showing the recorded marked area of the recording medium in accordance with this invention;

FIG. 6 is a plan view of the recording medium showing the recorded marked area of FIG. 5.

DESCRIPTION OF THE PREFERRED EMBODIMENT

In accordance with the invention, the novel optical recording medium comprises adjacent thin layers of at least two materials which, upon marking with an energy beam, endothermically form a marked area having optical properties different from the optical properties of the materials.

In the embodiment of the recording medium, according to the invention shown in FIG. 1, the medium 10 comprises a substrate 12 which can be transparent or opaque depending upon the application for which the medium is to be used. A layer 14 of a first material is deposited upon the substrate 12 and this first material is preferably a metal. A layer 16 of a second material is deposited upon the first layer 14, and the second material is preferably a metal or a semiconductor. A passivating layer 18 is deposited upon the medium 10 to protect the materials comprising layers 14 and 16 from corrosion due to exposure to environmental factors during the lifetime of the medium.

Information is recorded in medium 10 by directing an energy beam of suitable power level to the medium. The energy beam is absorbed in layer 16 and, to a lesser extent in layer 14, to cause localized heating in the adjoining areas of layers 14 and 16 of sufficient magnitude to produce a change in the optical properties of the materials comprising layers 14 and 16.

The energy beam, such as beam B1 shown in the drawing, is preferably directed toward the surface 11 of the medium to produce a recorded spot 19. However, should the substrate 12 be transparent to the radiation in the energy beam, beam B2 could as well be utilized to produce recorded spot 19 by directing beam B2 through substrate 12. In this case, the materials comprising layers 14 and 16 would be interchanged.

The exact nature of the change that takes place is not fully understood since the heating takes place in a time which is in the order of 20 nanoseconds. FIG. 4 shows what is believed to occur during recording with localized melting in layers 14 and 16 due to heating by the beam B1 and a mixing of the component materials across their interface as shown by the small arrows. FIGS. 5 and 6 show the recorded area 19 after recording. Examination of the recorded area 19 with a Scanning Electron Microscope (SEM) shows a flat recorded spot on a flat background, and no noticeable change in composition from inside to outside the recorded spot. The optical changes are believed to result from either an alloying or mixture of the two materials comprising layers 14 and 16 or an inversion of these layers. Referring to FIG. 2, the configuration of the medium 20 is very similar to the FIG. 1 embodiment with substrate 22 composed of any substrate material suitable for a recording medium. Layer 24 is deposited upon the substrate and this layer is preferably a metal. Layer 26 is deposited upon layer 24, and layer 26 is preferably a semiconductor. Note that in this case, a separate passivation layer is not required since the semiconductor layer 26 also serves as a passivation layer. Suitable semiconductor materials can be chosen from germanium or silicon.

The embodiment of the invention shown in FIG. 3 shows a further configuration of a medium 30 comprising a suitable substrate 32, a first recording layer 34 which preferably comprises a metal, a second recording layer 36 which preferably comprises either a metal or a semiconductor, and a thick passivation layer 38. In this case, passivation layer 38 can be several thousand Angstroms thick and may comprise poly(methyl methacrylate) (PMMA) or other suitable polymeric materials. In this embodiment, the passivation layer 38 is sufficiently thick so that its surface 40 is not in the same focal plane as the recording layers 34, 36. This construction has the advantage that minor amounts of dust or other contaminants on the surface 40 of the medium 30 do not adversely affect either recording or playback operations.

The preferred medium comprises a 200 Angstrom thick layer of Al deposited on a PMMA substrate, followed by deposition on the Al of a 230 Angstrom thick layer of Ge, and a passivating layer of SiO$_2$ substantially as shown in FIG. 1. This medium had spots recorded with a dye laser at a wavelength of 5800 Angstroms, using a pulse width of 10 nanoseconds. No attempt was made to optimize the laser power requirements, but the tests indicated a power level requirement no greater than that required for a standard SiO$_2$ overcoated Te Optical Recording Material. The recorded spots, when examined by SEM, showed flat recorded spots along with flat background. The contrast was sufficiently high that reliable reading could be accomplished.

A similar medium was fabricated using a 200 Angstrom thick layer of Al deposited on a PMMA substrate. A layer of Si 350 Angstrom thick was deposited on the Al layer and overcoated with a passivating layer of MgO. The writing energy for a 1000 Angstrom thickness of MgO was slightly higher than that for Ge-Al. The contrast was also less, but the contrast could be varied with the thickness of the MgO layer. The SEM showed a slightly domed spot, but no material was removed, and the reflectivity within the spot was consistently higher than outside the spot.

A medium was made with a 300 Angstrom thickness Pb layer deposited on a PMMA substrate. A 320 Angstrom thick layer of Sn was then deposited over the Pb followed by a 1000 Angstrom thick passivating layer of SiO$_2$. The writing energy to form a recorded spot was a factor of 2 greater than for the Ge-Al medium. The constrast was also lower than that for other media tested. The SEM shows a segmented effect in the film with individual segments being fully "written" or else completely "unwritten". While the medium was regarded as unsuitable for some applications, it could be used in a digital form of recording.

A medium which may require the lowest laser power comprises a 300 Angstrom thick layer of In deposited on a PMMA substrate, overcoated with a 230 Angstrom thick Ge layer and a passivating layer of SiO$_2$. Based on the melting point of this combination of materials, the laser power required should be the lowest, however, this has not yet been established by actual tests.

Several films were made of Au and Si, but no optimization was achieved as to the thicknesses for the components in the film. Because of the cost and the promising nature of other systems, this medium was not pursued, although there is no reason in principle why this medium would not be a suitable recording medium.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. An optical storage medium having a predetermined surface profile comprising adjacent thin discrete layers of at least two materials which, upon marking with an energy beam, form a marked area having optical properties different from the optical properties of the unmarked areas;

said at least two materials being selected from a first material consisting of Al and a second material consisting of Ge;

said medium, after marking with said energy beam, having a surface profile substantially the same as said predetermined surface profile.

2. An optical storage medium having a predetermined surface profile including a substrate carrying a first and a second discrete layer of different materials which, upon marking with an energy beam, endothermically form a marked area having optical properties different from the optical properties of the unmarked areas, the improvement comprising:

said first layer consisting of a metal;

said second layer consisting of a metal or a semiconductor; and said medium, after marking with said energy beam to form an alloy or mixture, having a surface profile substantially the same as said predetermined surface profile.

3. The optical storage medium in accordance with claim 2 wherein said first layer is selected from the group consisting of Al, Au, Pb, Sn and said second layer is selected from the group consisting of Al, Au, Pb, Sn, Ge and Si.

4. The optical storage medium in accordance with claim 2 wherein said first layer is Al and said second layer is Ge.

5. The optical storage medium in accordance with claim 2 wherein said endothermically formed marked area consists of an alloy or mixture of said materials.

6. The optical storage medium in accordance with claim 1 wherein said surface profile of said medium, after marking with said energy beam, comprises at least one flat marked area on a flat background comprising said unmarked areas.

* * * * *